(12) United States Patent
Bauer (10) Patent No.: US 8,668,253 B2
(45) Date of Patent: Mar. 11, 2014

(54) INTEGRATED DOOR SCUFF PLATE AND WIRE SHIELD

(75) Inventor: William Bauer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/494,152

(22) Filed: Jun. 12, 2012

(65) Prior Publication Data

US 2013/0328354 A1 Dec. 12, 2013

(51) Int. Cl.
*B60N 3/00* (2006.01)

(52) U.S. Cl.
USPC .......................... 296/199; 296/1.08; 296/209

(58) Field of Classification Search
USPC ........ 296/209, 1.08, 901.01, 199, 208, 97.23, 296/39.1, 203.03, 146.9
See application file for complete search history.

(56) References Cited

U.S. PATENT DOCUMENTS

| 3,630,564 | A | 12/1971 | Ferrara |
| 5,016,842 | A | 5/1991 | Suzuki et al. |
| 5,288,121 | A | 2/1994 | Graves |
| 5,613,327 | A | 3/1997 | Sauve |
| 5,844,169 | A | 12/1998 | Uemura et al. |
| 5,902,007 | A | 5/1999 | Koester et al. |
| 6,062,633 | A * | 5/2000 | Serizawa ...................... 296/199 |
| 7,140,070 | B2 * | 11/2006 | Yuta et al. ........................... 16/4 |
| 7,318,621 | B2 | 1/2008 | Suzuki et al. |
| 7,612,286 | B2 | 11/2009 | Lipp et al. |
| 7,628,447 | B2 * | 12/2009 | Sugimoto et al. ............. 296/209 |
| 2005/0082813 | A1* | 4/2005 | Seong ........................... 280/782 |
| 2007/0085361 | A1 | 4/2007 | Hauser |
| 2011/0115376 | A1 | 5/2011 | Shiratsuchi et al. |
| 2011/0260025 | A1* | 10/2011 | Aoshima et al. ......... 248/231.81 |

FOREIGN PATENT DOCUMENTS

| GB | 2455646 A | 6/2009 |
| JP | 2001037040 A | 2/2001 |
| JP | 2007104763 A | 4/2007 |
| JP | 2010023798 A | 2/2010 |

* cited by examiner

*Primary Examiner* — Jason S Morrow
*Assistant Examiner* — E Turner Hicks
(74) *Attorney, Agent, or Firm* — Vichit Chea; Price Heneveld LLP (57) ABSTRACT

A scuff plate assembly for use with an automotive vehicle door side sill includes an elongate scuff plate trim and a U-shaped wire shield for housing a wire harness. The scuff plate trim and wire shield are integrally coupled by a deformable living hinge that is disposed on an upper portion of the wire shield.

20 Claims, 7 Drawing Sheets

INTEGRATED DOOR SCUFF PLATE AND WIRE SHIELD

FIELD OF THE INVENTION

The present invention generally relates to a door scuff plate for an automotive vehicle door side sill, and more particularly to a door scuff plate assembly with an integrated wire shield.

BACKGROUND OF THE INVENTION

Generally, an automotive vehicle has a side sill located in the door opening. A door scuff trim is typically positioned over the side sill to cover the vertically extending flanges that form a portion of the side sill. A wire harness often runs along the side sill, and the door scuff trim covers and protects the wire harness, as well as an end portion of a floor carpet. The door scuff trim is often stepped on when passengers are entering or exiting the vehicle, yet is also designed to provide an aesthetically pleasing appearance.

SUMMARY OF THE INVENTION

One aspect of the present invention includes a scuff plate assembly for use with an automotive vehicle door side sill. The scuff plate assembly includes an elongate scuff plate trim and a U-shaped wire shield for housing a wire harness. The scuff plate trim and wire shield are integrally coupled by a deformable living hinge that is disposed on an upper portion of the wire shield.

Another aspect of the present invention includes a scuff plate assembly for use with an automotive vehicle door side sill. The scuff plate assembly includes an elongate scuff plate trim, a wire shield, a deformable living hinge, and a wire harness disposed along the length of the wire shield. The living hinge integrally couples the scuff plate trim and wire shield and is disposed on an upper portion of the scuff plate assembly.

Yet another aspect of the present invention includes an assembly method for installing a scuff plate assembly to an automotive vehicle door side sill. The method includes forming a scuff plate trim comprising an elongate scuff plate and a wire shield coupled by a living hinge, and mounting the scuff plate trim in an open position to the door side sill. The method further includes the steps of inserting a wire harness into the wire shield, and then pivoting the scuff plate trim to a closed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
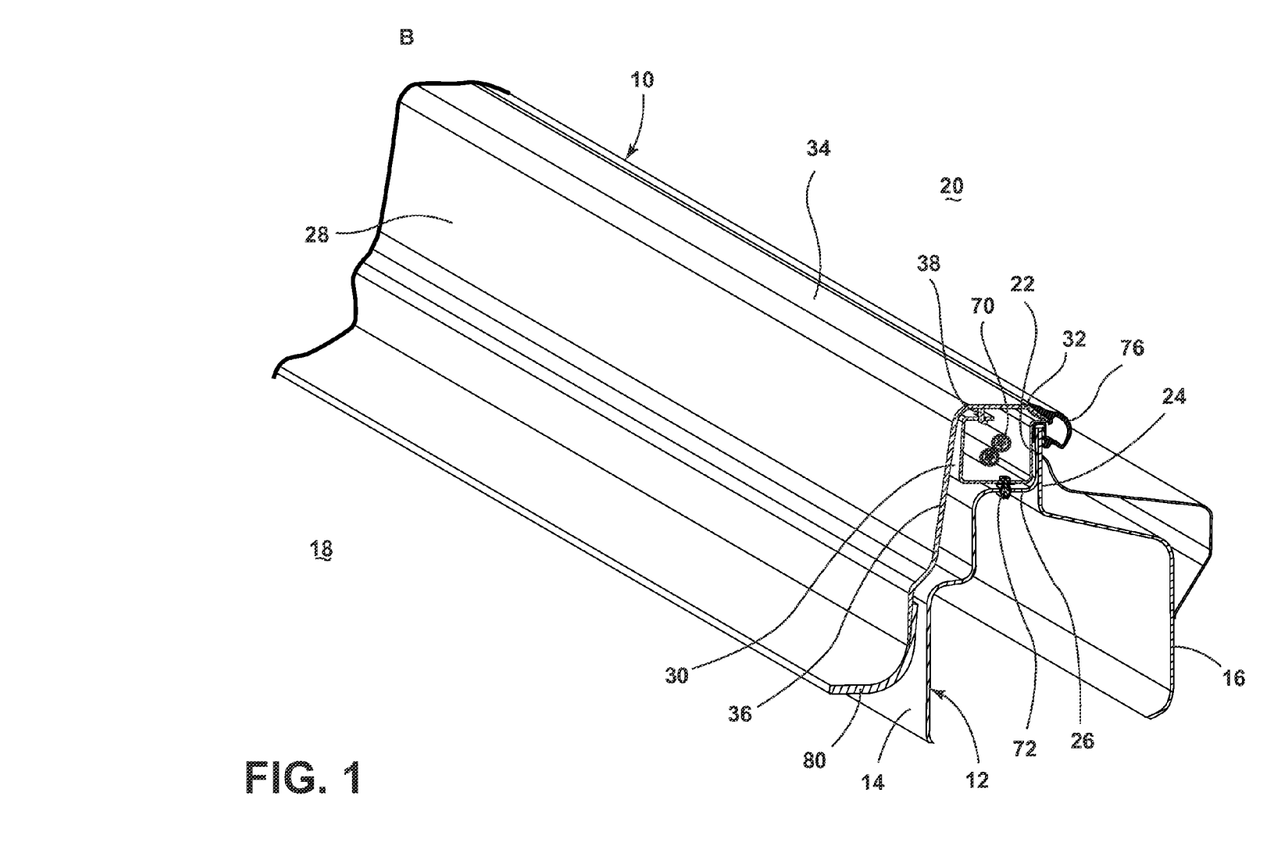
FIG. 1 is a top perspective, cross-sectional view of a scuff plate assembly and a vehicle door side sill, according to one embodiment.

For purposes of description herein, the terms "upper," "lower," "right," "left," "rear," "front," "vertical," "horizontal," "interior," "exterior," and derivatives thereof shall relate to the scuff plate assembly as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
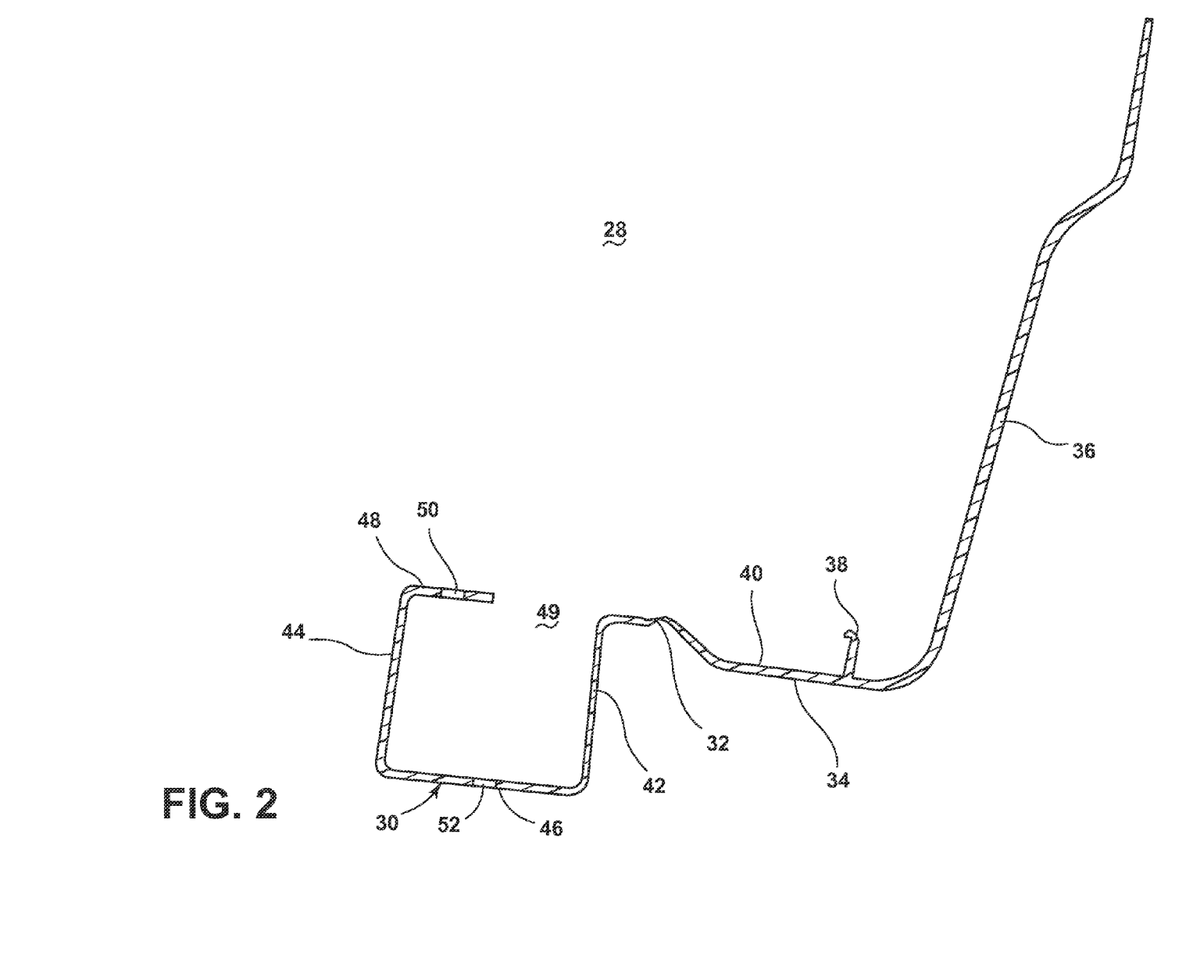
FIG. 2 is cross-sectional side view of a scuff plate trim of the scuff plate assembly of FIG. 1, illustrating an open position.
Figure 3:
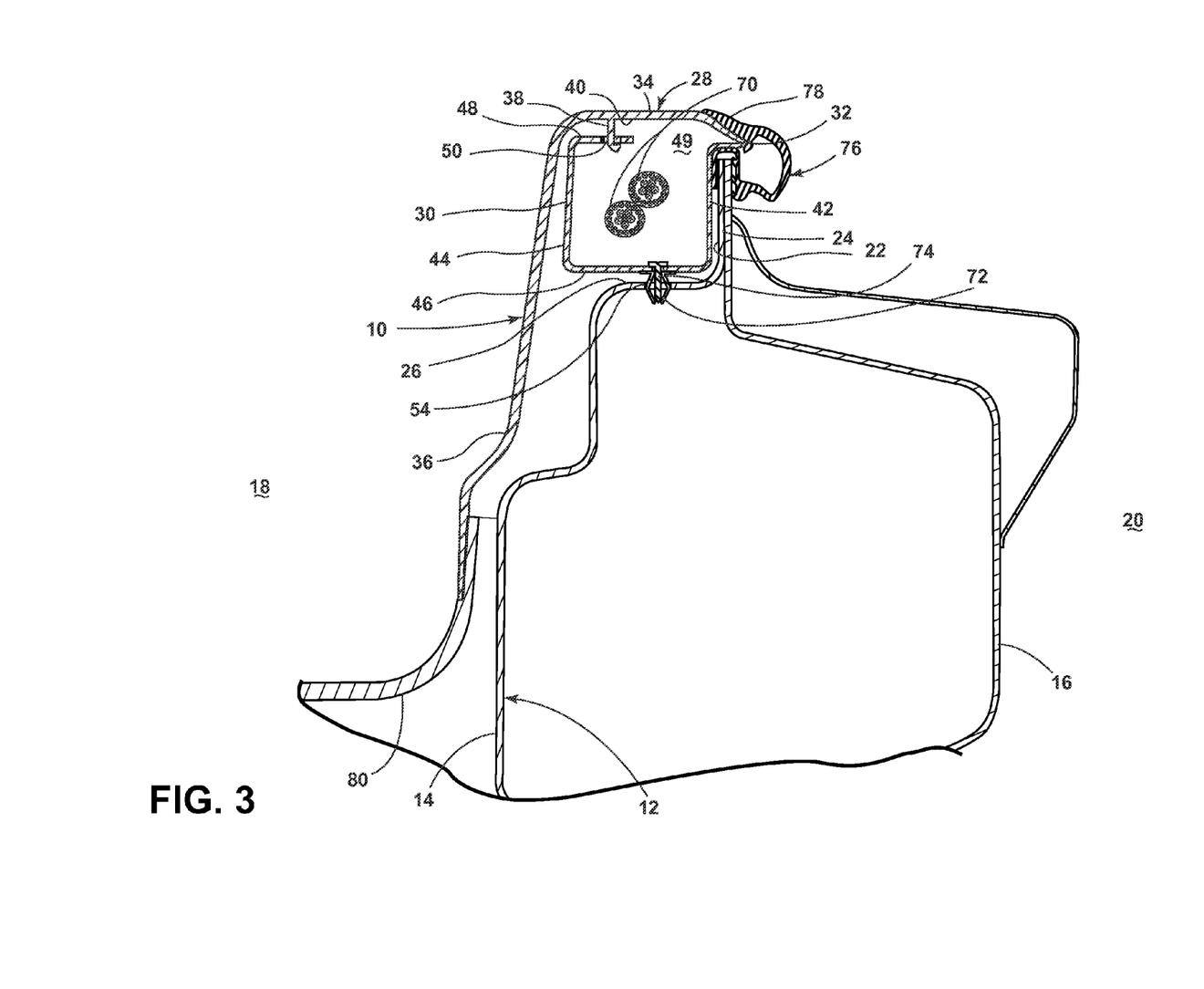
FIG. 3 is a cross-sectional side view of the scuff plate assembly and vehicle door side sill of FIG. 1, oriented in the closed position.

Referring to FIGS. 1-3, reference numeral 10 generally designates a scuff plate assembly for use with an automotive vehicle door side sill 12. The side sill 12 is an elongated member located at the bottom of a vehicle door opening and formed by an inner side sill 14 and an outer side sill 16. The inner side sill 14 extends toward an interior 18 of the vehicle, while the outer side sill 16 extends toward an exterior 20 of the vehicle. The inner side sill 14 and the outer side sill 16 are joined along vertically extending projection pieces, referred to as inner flange 22 and outer flange 24. The flanges 22 and 24 are disposed at the end portions of the inner side sill 14 and the outer side sill 16 and are welded together to form the side sill 12. Of course, other methods of attaching the flanges 22 and 24 together are also feasible, such as using fasteners. Additionally, the inner side sill 14 includes a stepped portion 26 disposed interior to the flange 22.

Referring now to FIGS. 1 and 2, the scuff plate assembly 10 is an elongate member that extends along the length of the side sill 12. The scuff plate assembly 10 includes an elongate scuff plate trim 28 and a wire shield 30 coupled therebetween by a living hinge 32. The scuff plate trim 28 and wire shield 30 are injection molded components formed of a suitable plastic material, according to one embodiment. It should be appreciated that scuff plate trim 28 and wire shield 30 may be made of other materials. As understood by those skilled in the art, the living hinge 32 is a thin, flexible strip of material formed during the injection molding of the scuff plate trim 28 and wire shield 30. The living hinge 32 pivotally connects the scuff plate trim 28 and wire shield 30 together. Further, the living hinge 32 is disposed on an upper portion of the wire shield 30, and in the illustrated example, is positioned on an exterior side of the wire shield 30.

The scuff plate trim 28 is a unitary component, but for explanatory purposes will be described herein as being formed to include several portions. The scuff plate trim 28 includes a substantially horizontal portion, referred to herein as scuff plate 34, and a downward extending portion 36. A plurality of snaps 38 extend down from an inner surface 40 of the scuff plate 34. The snaps 38 are spaced along the length of the scuff plate 34.

The wire shield 30 is also an elongated member having a substantially U-shaped cross-section adapted to house a wire harness 70 therewithin. While the illustrated example depicts a U-shaped cross-section according to one embodiment, other cross-sectional geometries are feasible, including ovate or other suitable non-uniform geometries according to other embodiments. The exemplary wire shield 30 has an interior wall 42, an exterior wall 44, and a lower surface, referred to as bottom wall 46. The wire shield 30 also includes a substantially horizontal tab 48 that extends from a top portion thereof. The illustrated example shows the tab 48 positioned at an upper end of the exterior wall 44. The tab 48 extends only a portion of the distance between the interior wall 42 and the exterior wall 44, thereby defining an opening 49 in the upper portion of the wire shield 30. Additionally, the tab 48 includes a plurality of spaced slots 50, and the bottom wall 46 includes a plurality of spaced apertures 52. The slots 50 in the tab 48 are adapted to engage the snaps 38, thereby retaining the scuff plate trim 28 to the wire shield 30 in a closed position B.

Referring now to FIG. 3, the scuff plate assembly 10 covers the side sill 12 and is affixed thereto by a plurality of fasteners, such as pinch top clips 72, which are attached by threaded fasteners 74 through the apertures 52 (FIG. 2) in the bottom wall 46 of the wire shield 30. The pinch top clips 72 are coupled to a plurality of spaced slots 54 disposed along the stepped portion 26 of the inner side sill 14.

Additionally, a door weather strip 76 is mounted to the side sill 12, and can be affixed to the inner and outer side sills 14 and 16. A lip 78 of the weather strip 76 is adapted to overlie an interior portion of the scuff plate 34, thereby covering the living hinge 32. Also, a carpet 80 is typically installed on a floor of the vehicle. The lower end of the downward extending portion 36 of the scuff plate trim 28 covers, and perhaps helps retain, the edge of the carpet 80.

Figure 4:
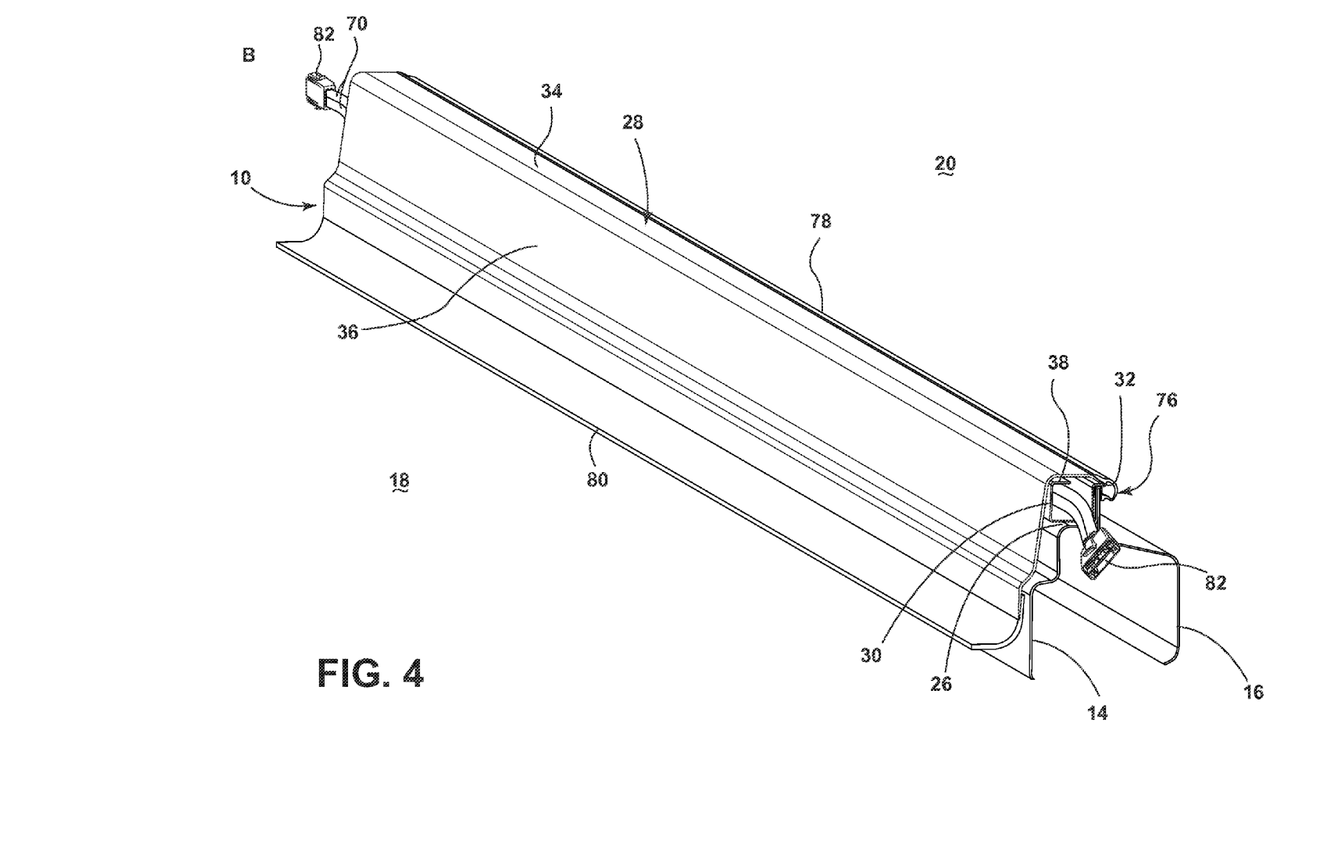
FIG. 4 is a top perspective view of a scuff plate assembly and vehicle door side sill, according to another embodiment.

According to one embodiment, the wire harness 70 is included as part of the scuff plate assembly 10. As illustrated in FIG. 4, the wire harness 70 may include electrical connectors 82 on each end thereof, the purpose of which is discussed below.

Figure 5:
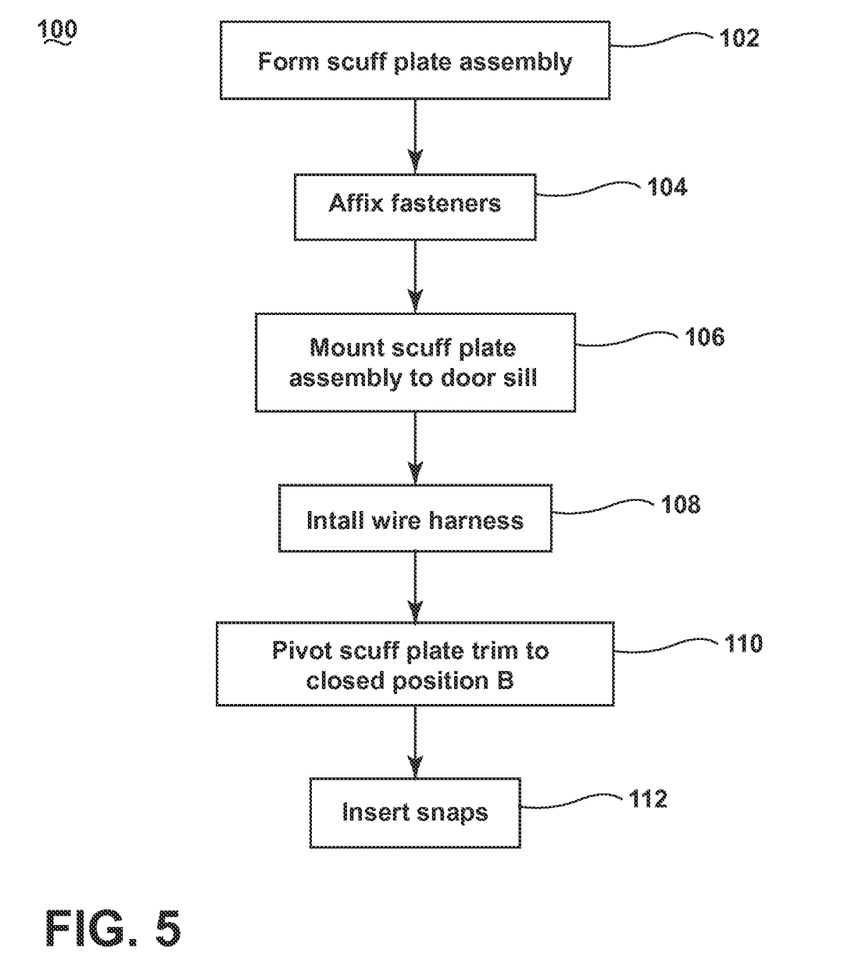
FIG. 5 is flow diagram, illustrating an assembly method for installing the scuff plate assembly of FIG. 1 to the vehicle door side sill, according to one embodiment.
Figure 6:
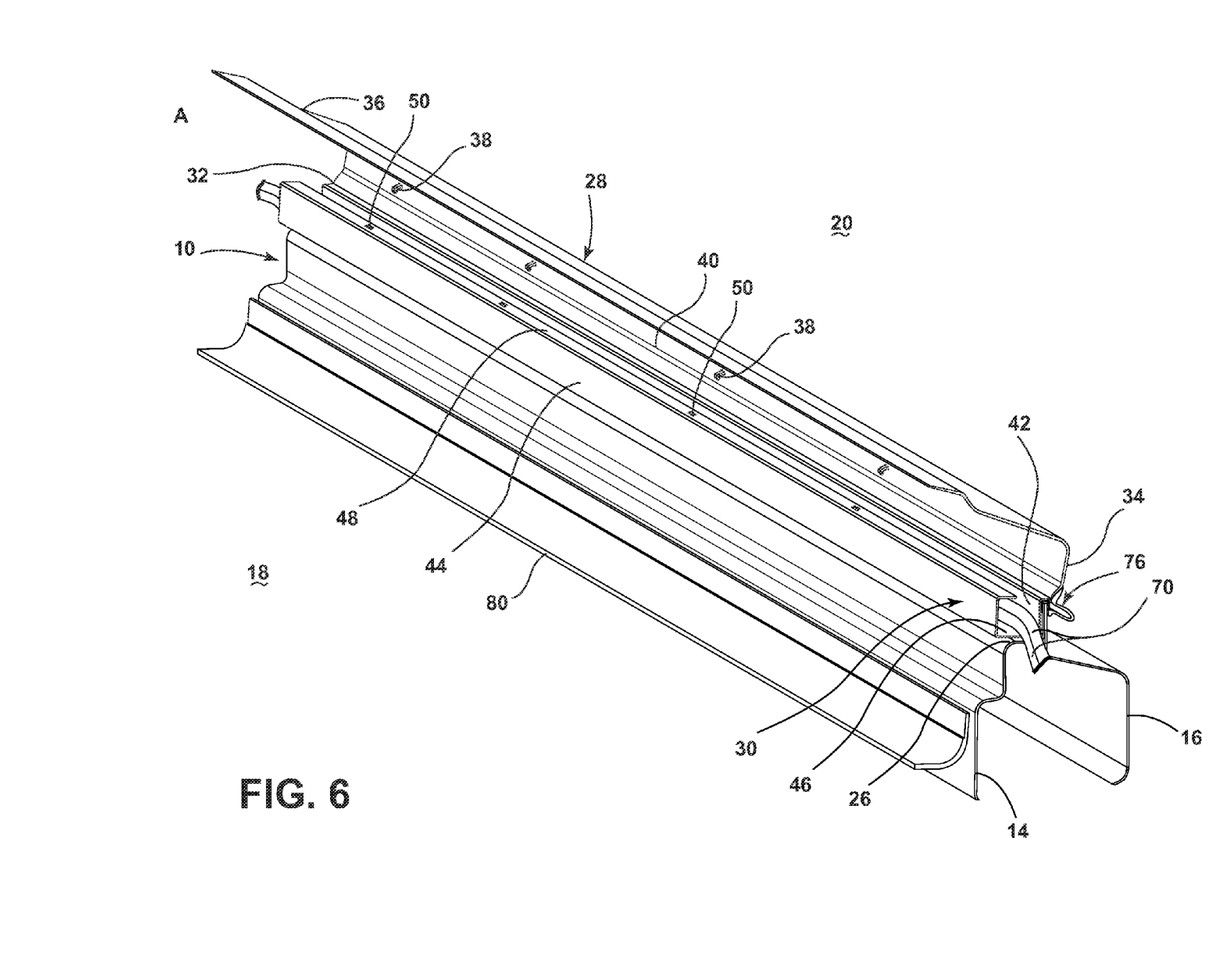
FIG. 6 is a top perspective view of the scuff plate assembly and vehicle door side sill of FIG. 1, in the open position.

In one embodiment, illustrated in FIG. 5, an assembly method 100 for installing the scuff plate assembly 10 to the vehicle door side sill 12 is shown. The assembly method 100 begins at step 102 where the scuff plate trim 28 is formed as a unitary member through the process of injection molding, as described above, and includes the scuff plate 34 and wire shield 30 coupled by the living hinge 32. The assembly method 100 continues with step 104 affixing a plurality of fasteners or pinch top clips 72 to a bottom wall 46 of the wire shield 30 to form the scuff plate assembly 10. In step 106, the scuff plate assembly 10 is mounted to the door sill 12 by inserting the pinch top clips 72 into the spaced slots 54 on the stepped portion 26 of the inner side sill 14. The scuff plate assembly 10 is mounted to the door sill 12 in an open position A, as illustrated in FIG. 6. In step 108, wire harness 70 is installed by inserting the wire harness 70 into the opening 49 of the wire shield 30. The wire harness 70 may be a portion of the larger vehicle body wire harness and extends the length of the scuff plate assembly 10 when housed within the wire shield 30. The method 100 continues to step 110 where the scuff plate trim 28 is pivoted about the living hinge 32 to the closed position B. In step 112, before the scuff plate trim 28 fully reaches the closed position B, the snaps 38 on the scuff plate 34 are inserted in to the slots 50 on the tab 48, thereby retaining the scuff plate trim 28 to the wire shield 30 in the closed position B.

Figure 7:
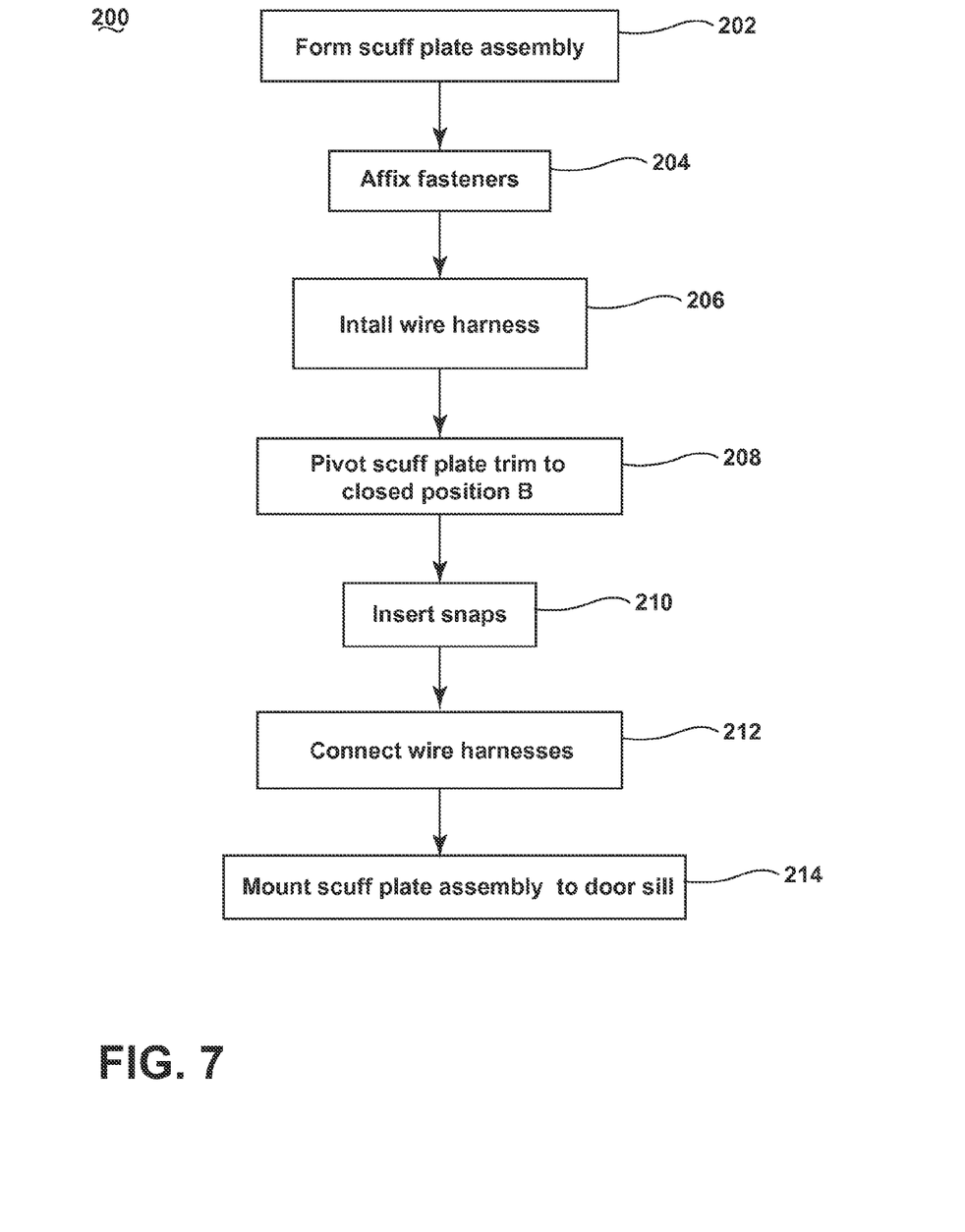
FIG. 7 is flow diagram, illustrating an assembly method for installing the scuff plate assembly of FIG. 5 to the vehicle door side sill, according to another embodiment.

In another embodiment, illustrated in FIG. 7, of an assembly method 200, the wire harness 70 is included in the scuff plate assembly 10. In this embodiment, the method 200 begins with steps 202 and 204, forming the scuff plate assembly 10 and affixing a plurality of pinch top clips 72, in the same manner as method 100. Method 200 then continues to step 206 in which the wire harness 70 is inserted into the opening 49 of the wire shield 30. Once the wire harness 70 is installed, the scuff plate trim 28 is pivoted about the living hinge 32 to the closed position B. Before the scuff plate trim 28 fully reaches the closed position B, in step 210, the snaps 38 on the scuff plate 34 are inserted in to the slots 50 on the tab 48, thereby retaining the scuff plate trim 28 to the wire shield 30 in the closed position B. Now the scuff plate assembly 10, including the pinch top clips 72 and wire harness 70, with connectors 82, as shown in FIG. 4, is ready to be installed into the vehicle. The method 200 continues by connecting both of the electrical connectors 82 of the wire harness 70 to the vehicle main body wire harness, as in step 212. The method 200 concludes at step 214 with mounting the scuff plate assembly 10 to the door sill 12 by inserting the pinch top clips 72 into the spaced slots 54 on the stepped portion 26 of the inner side sill 14.

Additionally, either embodiment of method 100 or 200 may also include maneuvering the lip 78 of the weather strip 76 to be positioned above the scuff plate 34, thereby hiding the living hinge 32 from view.

The scuff plate assembly 10 advantageously offers several benefits to the assembly of the vehicle. To begin, the scuff plate assembly 10 eliminates the manufacturing step of installing a separate wire shield and scuff plate trim to the vehicle during the final manufacture of the vehicle. Instead, the wire shield 30 and scuff plate trim 28 are formed as one component, requiring only one assembly step, thereby simplifying the manufacturing process. Additionally, for the embodiment described in assembly method 200, manufacture of the scuff plate assembly 10 can be performed off-line at another location within the final assembly plant, or off-site by a components supplier. Further still, reducing the number of components required to be inventoried and stored both on the vehicle assembly line and within the manufacturing plant is also advantageous.

Another benefit the scuff plate assembly 10 provides is with respect to the serviceability of the wire harness 70. Traditionally, to service the wire harness 70, the entire scuff plate trim 28, and possibly the wire shield 30, would have to be removed. Because the living hinge 32 is positioned near the upper portion of the scuff plate assembly 10, the scuff plate trim 28 can just be unsnapped from the tabs 48 and pivoted to the open position A, allowing access to the wire harness 70. Once the wire harness 70 has been serviced, the scuff plate trim 28 is pivoted and snapped back to the closed position B.

It will be understood by one having ordinary skill in the art that construction of the described scuff plate assembly and other components and method of assembly is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the scuff plate assembly as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

I claim:

1. A scuff plate assembly for use with an automotive vehicle door side sill, the scuff plate assembly comprising:
    an elongate scuff plate trim; and
    a U-shaped wire shield extending substantially the full length of the scuff plate trim for housing a wire harness and supporting the scuff plate trim;
    wherein the scuff plate trim and wire shield are integrally coupled by a deformable living hinge disposed on an upper portion of the wire shield.

2. The scuff plate assembly of claim 1, wherein the wire shield comprises a substantially horizontal tab that extends from a top portion thereof, the tab including a plurality of slots.

3. The scuff plate assembly of claim 2, wherein the scuff plate trim comprises a substantially horizontal portion and a downward extending portion, and a plurality of downward extending snaps are disposed along an inner surface of the horizontal portion.

4. The scuff plate assembly of claim 3, wherein the slots in the tab are adapted to engage the snaps, thereby retaining the scuff plate trim to the wire shield.

5. The scuff plate assembly of claim 4, wherein the scuff plate assembly covers the door side sill and is affixed thereto.

6. The scuff plate assembly of claim 5, further comprising a plurality of fasteners affixed to a lower surface of the wire shield, wherein the plurality of fasteners is coupled to a plurality of slots disposed in the door side sill.

7. The scuff plate assembly of claim 6, wherein the living hinge is covered by a portion of a door weather strip mounted to the door side sill.

8. A scuff plate assembly for use with an automotive vehicle door side sill, the scuff plate assembly comprising:
    an elongate scuff plate trim;
    a wire shield extending the length of the scuff plate trim;
    a deformable living hinge; and
    a wire harness disposed along the length of the wire shield;
    wherein the living hinge integrally couples the scuff plate trim and wire shield and is disposed on an upper portion of the scuff plate assembly.

9. The scuff plate assembly of claim 8, wherein the living hinge is covered by a portion of a door weather strip mounted to the door side sill.

10. The scuff plate assembly of claim 8, further comprising a plurality of fasteners affixed to a lower surface of the wire shield, wherein the plurality of fasteners is coupled to a plurality of apertures in the door side sill.

11. The scuff plate assembly of claim 8, wherein the wire shield includes a plurality of spaced slots disposed along the length thereof.

12. The scuff plate assembly of claim 11, wherein the scuff plate trim includes a plurality of snaps disposed along the length thereof.

13. The scuff plate assembly of claim 12, wherein the slots in the wire shield are adapted to engage the snaps on the scuff plate trim, thereby retaining the scuff plate trim to the wire shield.

14. An assembly method for installing a scuff plate assembly to an automotive vehicle door side sill, comprising:
    forming a scuff plate trim comprising an elongate scuff plate and a substantially continuous wire shield coupled by a living hinge;
    wherein the wire shield extends substantially the full length of the scuff plate trim;
    mounting the wire shield to the door side sill, wherein the scuff plate trim is in an open position;
    inserting a wire harness into the wire shield; and
    pivoting the scuff plate trim to a closed position.

15. The assembly method of claim 14, wherein the step of mounting the wire shield comprises affixing a plurality of fasteners to a lower surface of the wire shield, then coupling the fasteners to a plurality of slots disposed in the door side sill.

16. The assembly method of claim 14, wherein a plurality of downward extending snaps are disposed along an inner surface of a horizontal portion of the scuff plate trim.

17. The assembly method of claim 16, wherein the wire shield comprises a substantially horizontal tab that extends from a top portion thereof, the tab including a plurality of slots.

18. The assembly method of claim 17, wherein the scuff plate trim is pivoted about the living hinge.

19. The assembly method of claim 18, further comprising inserting the snaps into the tab slots, thereby retaining the scuff plate trim to the wire shield in the closed position.

20. The assembly method of claim 14, wherein the scuff plate trim and wire shield are formed as a unitary member.

* * * * *